Patented Aug. 21, 1928.

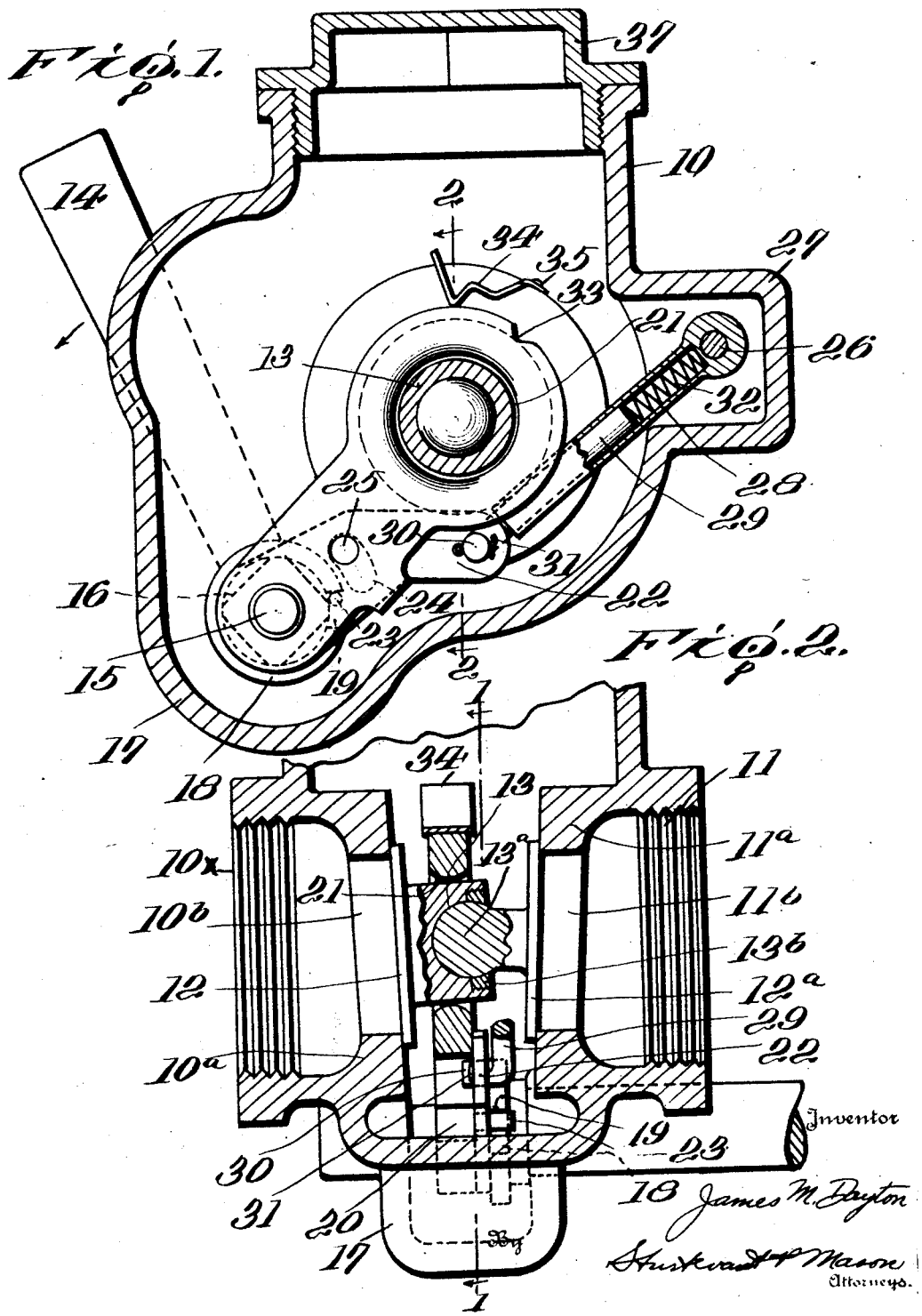

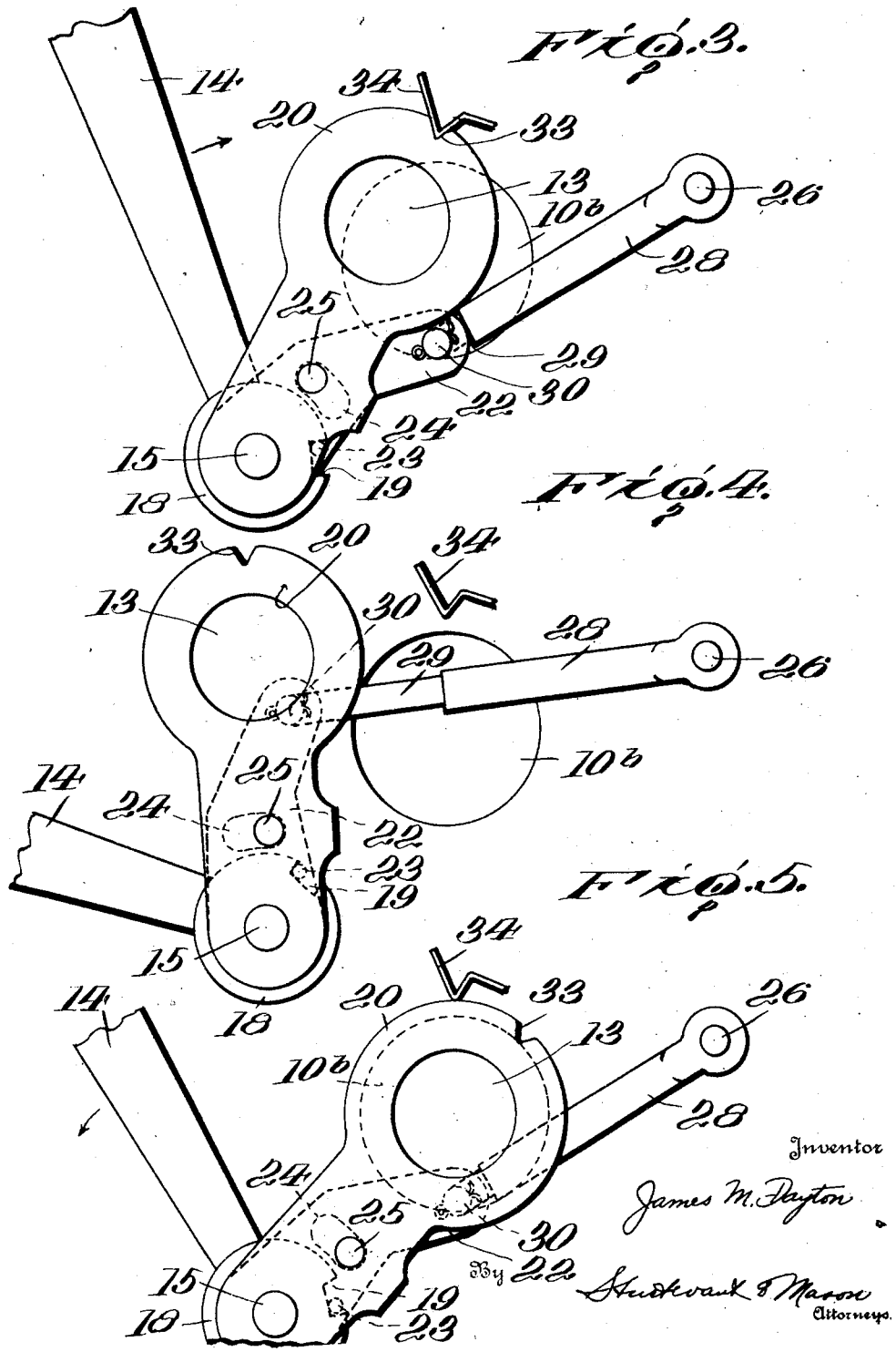

1,681,468

UNITED STATES PATENT OFFICE.

JAMES M. DAYTON, OF TORRINGTON, CONNECTICUT.

QUICK-ACTING GATE VALVE.

Application filed May 26, 1926. Serial No. 111,759.

This invention relates to valves of the type which are actuated from a closed position instantaneously to a position representing a substantial part of their opening without delaying in any of the intermediate positions; a similar action occurring during closing so that the valve is moved from a partly closed position instantaneously into a fully closed position, whereby wire drawing and creeping is prevented.

One of the objects of the invention is to provide such a valve of a simple type, having an actuating device formed of relatively few members. The valve is positive in actuation and in the event of failure of any part thereof, will be actuated in substantially the manner of the ordinary valve, so that even in the event of breakage, the device to which it is attached does not become inoperative.

The illustrated form of this valve is particularly adapted for use with the flow meter described in my copending application Serial No. 89,751 filed Feb. 20, 1926, to which reference is made for one example of the employment of such a valve.

With this and other objects in view as will appear in the course of the following specification, there is shown on the accompanying drawings:

Figure 1, a cross section through the valve substantially on line 1—1 of Fig. 2.

Fig. 2 is a section through the valve on line 2—2 of Fig. 1.

Figs. 3, 4 and 5 are diagrammatic views showing the positions of the parts of the valve respectively in three-quarter closed, fully opened, and the initial opening positions.

This valve comprises a casing 10 having the inlet and outlet connections $10^x$ and 11 thereon which are adapted to be connected to the supply and delivery pipes. These two connections terminate in the end walls $10^a$ and $11^a$ which have the apertures $10^b$ and $11^b$ which are adapted to be closed by the valve plates 12 and $12^a$. The valve plate 12 has a spherical socket 13 therein to receive the ball $13^a$ connected to the plate $12^a$. A retaining bushing $13^b$ is screw-threaded into the rim of the socket 13 to hold the ball $13^a$ in assembled position. It will be understood that the ball and socket connection permits a free relative movement of the plates with regard to each other whereby they will automatically aline themselves with the surfaces of the end walls $10^a$ and $11^a$ so as to close the apertures $10^b$ and $11^b$. The adjacent faces of these walls are preferably at a slight angle to one another so that the valve is self-sealing.

The actuating handle 14 is connected to the shaft 15 for example, by fitting over a squared end of the shaft as shown in dotted lines at 16 in Fig. 1. The shaft 15 projects inside a boss 17 on the casing 10 and inside the said boss carries a disk 18 which has a notch 19 in the edge thereof. A valve lever 20 is pivotally mounted on the shaft 15 and has an aperture 21 near its outer end to receive the outer portion of the socket 13 of the valve plate 12. This valve lever 20 serves for the purpose of moving the valve plates into and out of engagement with the respective end walls $10^a$ and $11^a$. A toggle link 22 is likewise pivotally mounted about the shaft 15. It will be understood that the collar 18, the toggle link 22, and the valve lever 20 are mounted in that order upon the shaft 15 as is shown in Fig. 2. A pin 23 on the toggle link 22 is received in the notch 19 on the collar 18. The toggle link 22 likewise has a slot 24 to receive the pin 25 on the valve lever 20. A second and extensible toggle lever is pivotally mounted at one end on a pin 26 mounted in a second boss 27 of the casing 10. The first portion of this extensible toggle link is a tube 28 which fits about and guides a rod 29. The end of the rod 29 is bent over at 30 and passes through an opening in the end of the toggle link 22, and is secured in that position by a cotter pin 31. A coil spring 32 is disposed within the tube 28 to exert pressure between the bottom of this tube and the end of the rod 29.

A notch 33 is provided in the end of the valve lever 20 to cooperate with the spring detent 34 which is fastened at 35 to the valve casing 10: this spring detent serves to maintain the valve lever in a substantially one-quarter closed position in the form illustrated, in the manner hereinafter described.

The various parts are inserted and removed from the allotted positions through the top of the casing 10 which is appropriately closed by a screw cover 37.

In the form illustrated, it is intended that when the handle 14 is operated, the valve which remains closed for a certain amount of movement of this handle, shall thereafter snap from the fully closed to a position substantially that of one-quarter open. Thereafter the valve will open in proportion to the movement of the handle until full opening is attained. On the contrary, when the valve is to be closed, the valve plates will be moved to a position representing substantially one-quarter open (or three-quarters closed) and thereafter will immediately snap from this position to a fully closed position. In this way it is not possible to produce an opening of the valve amounting to less than 25% of the normal aperture, either in opening or closing.

In Fig. 1, the valve is shown in the fully closed position with all parts at rest. The handle 14 is in the extreme clockwise position, as are all of the other parts.

If it be desired to open the valve, the handle 14 is moved counterclockwise as indicated by the arrow. The shaft 15 turns therewith and the collar 18 moves until the lower radial surface of the notch 19 engages against the pin 23, after which this collar 18 by means of pin 23 moves the toggle link 22 in a counterclockwise direction about the axis of the shaft 15, thereby compressing the coil spring 32 during the movement of the extensible link 29, 28 connected to the toggle link 22. During this interval, the toggle link 22 has moved with its slot 24 from the position shown in Fig. 1 in which the pin 25 is in the upper portion of the slot, to the position shown in Fig. 5, in which this pin is in the lower portion of the slot.

The parts are now substantially in the position shown in Fig. 5, with the axis of shaft 15, rod 30, and pin 26 in line. A very slight further movement of the handle 14 will cause the spring 32 to extend the link 29, 28, and thereby automatically move the toggle link 22 counterclockwise about the axis of shaft 15. During this movement of the link 22, its slot 24 will cooperate with the pin 25 to snap the valve lever 20 into a partially opened position. At the same time, the pin 23 of the link 22 no longer being driven by the collar 18, but being driven by the spring 32, moves forward at a greater rate of speed than the collar 19 and comes into contact with the upper radial surface of the notch 19, whereby it is held against further movement, and thus the valve is prevented from fully opening.

If the handle 14 continues to move in a counterclockwise direction, the spring 32 acting against the rod 29 and thereby driving the toggle link 22 and its slot 24 will cause the pin 25 and thereby the valve lever 20 and the valve plates to be moved farther and farther toward the open position in proportion to the handle movement, until the elements are in the fully open position shown substantially in Fig. 4.

If it is desired to close the valve, the handle 14 is moved in a clockwise direction, thereby driving the shaft 15 and the collar 18. The collar by the upper radial surface of its notch 19 engages the pin 23 and thereby causes a rocking of the toggle link 22 in a clockwise direction, and effects a compression of the spring 32. The slot 24 of the link 22 again moves until the pin 25 is in the upper or left-hand end thereof, and thereafter drives the valve lever 20. This movement of the parts continues until the axis of the shaft 15, the rod end 30 and the pin 26 are again in line. A slight distance further, the spring 32 may again extend and cause the toggle link 22 to be automatically rocked further in a clockwise direction to the position shown in Fig. 1. During this movement, the slot 24 of the link 22 will engage the pin 25 and cause the valve lever 20 to be snapped into a closed position. It will be noted that the links 22 and 29, 28 have their pivot 30 considerably below the line of centers, so that the valve plates 12 and 12$^a$ are forced against the end walls 10$^a$, 11$^a$ of the valve, whereby a tight shutting is assured.

In case of a breakage of the spring 32 or of the tube 28 or pin 29, the valve handle will act as before, and will not produce any movement of the valve plates 12, 12$^a$ during the initial portion of its movement, until the pin 23 rests against the lower radial face of the notch 19, and the pin 25 is in the lower portion of the slot 24: the valve handle will then positively actuate the valve plates 12, 12$^a$ and open the same. The closing movement is the same as before, but there is no snapping of the valve to the closed position: it is merely forced closed by the continued operation of the handle 14.

While the valve is being closed, the drive spring 24 will engage in the notch 33 of the periphery of the valve lever and assure the engagement of the pin 25 in the upper end of the slot 24 prior to the snapping of the toggle links past center.

It is apparent that the invention is not limited to the exact form of construction illustrated, but that it may be modified within the scope of the appended claims.

I claim:

1. In a valve having an aperture, a member selectively to close and free said aperture, a toggle, means to actuate said toggle to bring the axes of the same into and beyond a straight line, a spring to move the central axis of said toggle away from the line joining the outer axes thereof when the axes are not in a straight line, cooperating means on said toggle and member whereby said toggle moves independently of said member into a straight line while the member is in closing position, said cooperating means moving said member instantaneously to a position of substantial opening during the subsequent movement of said toggle beyond such straight line, said actuating means thereafter regulating the area of flow through said aperture between such position and the maximum.

2. In a valve having an aperture and closing means therefor, an actuating element having permissive free movement with regard to said means, mechanism having permissive free movement with regard to said element, and a spring, said element driving said mechanism independently of said means during the initial opening so as to compress said spring, said spring thereafter actuating said mechanism and means independently of said element to produce an instantaneous opening of said valve for a substantial fraction of its area, said means and element and mechanism thereafter moving in unison to gradually regulate the opening of said valve throughout the remainder of its area.

3. In a valve having an aperture and closing means therefor, an actuating element having permissible free movement with regard to said means, mechanism having permissive free movement with regard to said element, and a spring, said element driving said means and mechanism together and compressing said spring in regulating the opening from maximum to a predetermined minimum which is a substantial fraction of said maximum, said spring thereafter actuating said mechanism and means independently of said element to instantaneously close said valve to full closure.

4. In a valve having a casing, means on said casing for connection to delivery and discharge pipes, walls in said casing having alined apertures therethrough, plates to respectively close said apertures, said plates being connected together by a joint permitting self-alinement, an operating shaft extending into said casing, a valve lever pivotally mounted on said shaft for engaging said plate connection, a collar fixedly connected to said shaft to rotate therewith and having a notch in its periphery, a toggle link loosely pivoted on said shaft, a pin on said link to engage in said notch, said link having a slot formed therein, a pin on said valve lever and in said slot, an extensible toggle link comprising a tube and a rod tending to telescope with respect to each other, a spring in said tube to cause the extension of said extensible link, a pivotal connection between said toggle links, a pivotal support in said casing for the end of said tube, the axis of said pivotal connection being on one side of the plane of the axes of said shaft and said pivotal support when said valve is in closed position, and the other side thereof when said valve is in the opened position, said spring serving to move said pivotal connection from either lateral position slightly removed from alinement with said shaft and pivotal support into one of said displaced positions.

5. In a valve having an aperture, a member selectively to close and free said aperture, an operator, and devices connecting said operator and said member so that said operator may control said member to regulate the flow through said aperture between the maximum and a predetermined minimum, said devices including means to instantaneously move said member to close said aperture when said operator moves said member to a position of less than said predetermined minimum.

6. In a valve having an aperture, a member selectively to close and free said aperture, an operator, and devices connecting said operator and said member, said devices including means to hold said member against movement from closed position during the initial opening movement of said operator and thereafter to instantaneously move said member to a position of a predetermined minimum opening and thereupon to place said member under the control of said operator for the regulation of the flow through the aperture between the maximum and such predetermined minimum.

7. In a valve having an aperture, a member selectively to close and free said aperture, means including an operator to positively move said member from full open to closed position, a spring connected to said member, said spring being operated to store power by the operator during the first closing movement of the latter, said spring being adapted during the final closing movement normally to force said member instantaneously into its fully closed position independently of the positive actuation by said operator, so that said member is normally prevented by said spring from occupying a partly open position of less than a predetermined minimum but is subject to said operator for selective flow-controlling movement between the maximum open position and said predetermined minimum position.

8. In a valve having an aperture, a member selectively to close and free said aperture, means to positively move said member from closed to full open position, said means including an operator and a spring, said spring being operated by the actuator during the first opening movement of the actuator whereby to store power in said spring, said member remaining closed during said first opening movement of said actuator, said spring being adapted upon the movement of said actuator to a predetermined position with respect to said member to force said member instantaneously into a position of a predetermined minimum opening independently of the positive actuation by said actuator, so that said member is prevented by said instantaneous movement by said spring from occupying a partly open position of less than a predetermined minimum but is free for selective flow-controlling movement by said actuator between the maximum open position and said predetermined minimum position.

In testimony whereof, I affix my signature.

JAMES M. DAYTON.